3,070,502
PARENTERAL AQUEOUS TETRACYCLINE COMPOSITION CONTAINING N,N-DIMETHYLACETAMIDE SOLVENT
Harry Sponnoble, Kalamazoo Township, Kalamazoo County, Mich., assignor to The Upjohn Company, Kalamazoo, Mich., a corporation of Michigan
No Drawing. Filed June 17, 1958, Ser. No. 742,480
2 Claims. (Cl. 167—65)

This invention relates to a pharmaceutical composition and more particularly to an injectable pharmaceutical composition comprising tetracycline and special solvent therefor.

Tetracycline is a well-known broad spectrum antibiotic. It is available as the free base and as a salt, for example, tetracycline hydrochloride.

Notwithstanding the normal acceptability of oral dosage forms of tetracycline, a need exists for an elegant injectable composition, especially for individuals who are unable to take or tolerate this valuable antibiotic in oral dosage forms and in those circumstances where quick, high blood levels are desirable.

It is an object therefore, of the instant invention to provide injectable pharmaceutical preparations containing tetracycline. An additional object is to provide such injectable preparations which give high blood levels of the active ingredient. A further object is to provide such preparations which are stable and pharmaceutically acceptable. Other objects will be apparent to those skilled in the art to which this invention pertains.

The foregoing and additional objects have been accomplished by the provision of an injectable pharmaceutical composition comprising N,N-dimethylacetamide and tetracycline.

As used in the specification and claims, tetracycline is intended to include the free acid and the therapeutically active salts thereof. Illustrative salts of tetracycline include the following: the hydrochloride and the phosphate complex.

Broadly described, this invention contemplates the use of N,N-dimethylacetamide as a solvent for preparing injectable solutions of tetracycline. The said solutions can be made available to the practitioners in a form ready for immediate injection or in a form for extemporaneous preparation of the injectable solution.

The amount of the principal active ingredient of the novel composition, i.e, tetracycline, can vary over a considerable range. From about 0.5 percent weight/volume to about fifty percent weight/volume can be utilized; however, from about 2.5 percent weight/volume to about 25 percent weight/volume is preferred depending on the age and condition of the patient.

The concentration of N,N-dimethylacetamide used can vary between about five percent volume/volume and ninety percent volume/volume.

Various complementary active ingredients can be added to the novel compositions of the invention. Illustratively, but not limiting, the following can be utilized: other antibiotics such as penicillins, streptomycin, erythromycin, oxytetracycline, chlortetracycline and novobiocin; corticosteroids such as hydrocortisone, prednisolone, prednisone, 6-methylprednisolone, 9-alpha-fluoro-16-alphahydroxyprednisolone; vitamins such as the folic acid, nicotinamide, B complex vitamins, ascorbic acid; and the like.

Useful supplementary ingredients in the novel compositions are preservatives, for example, benzyl alcohol, chlorobutanol, methylparaben, propylparaben, and quaternary ammonium compounds; isotonic agents, for example, lactose, sodium chloride, dextrose and sucrose; stabilizers, for example, nicotinamide; and buffers.

The compositions of the invention possess utility in the treatment of a wide range of infectious diseases, for example, Rocky Mountain spotted fever, typhus, Q fever, Brill's disease, primary atypical pneumonia and many more.

In addition to producing an elegant pharmaceutical preparation, the use of N,N-dimethylacetamide, especially in combination with benzyl alcohol, also produces higher serum levels of tetracycline after parenteral administration. This is shown by the data given in the tables following Example 4.

The following examples set forth the best mode contemplated of carrying out the invention but are not to be construed as limiting.

EXAMPLE 1.—INJECTABLE SOLUTION

A. 1000 milliliters of an injectable solution are prepared from the following types and amounts of ingredients.

Each milliliter:                                                Total
    55 mg. tetracycline hydrochloride_____grams__  55
    25 mg. lactose_____do____  25
    9 mg. benzyl alcohol_____do____   9
    10 percent v./v. N,N-dimethylacetamide
                                             milliliters___ 100
    Q.s. water for injection ad 1000 milliliters.

The N,N-dimethylacetamide is dissolved in part of the water for injection. The solid ingredients are dissolved in this solution. The solution is brought up just short of the final volume and the benzyl alcohol is added and mixed well until dissolved. The solution is then made up to final volume with water for injection, sterilized by passage through a sterilized bacterial filter and filled into five-milliliter ampoules under aseptic conditions.

B. To produce a similar preparation containing an equivalent amount of tetracycline phosphate complex, 67 grams of the complex would be substituted for the hydrochloride in the above formula.

EXAMPLE 2.—INJECTABLE SOLUTION

Five liters of an injectable solution are prapared from the following types and amounts of ingredients.

Each milliliter:                                                Total
    100 mg. tetracycline acid_____grams__ 500
    9 mg. benzyl alcohol_____do____  45
    75 percent v./v. N,N-dimethylacetamide
                                             milliliters__ 3750
    Q.s. water for injection ad 5000 milliliters.

The benzyl alcohol is dissolved in the N,N-dimethylacetamide. The tetracycline acid is dissolved in this solution and the mixture brought up to volume with water for injection. The final solution is sterilized by passage through a sterile bacterial filter and filled under aseptic conditions into one-milliliter ampoules.

EXAMPLE 3.—DRY POWDER AND DILUENT FOR EXTEMPORANEOUS RECONSTITUTION

One thousand vials of dry powder tetracycline hydrochloride and one thousand five-milliliter ampoules of diluent are prepared from the following types and amounts of materials.

A. Dry powder tetracycline hydrochloride.

Each vial: | Total, grams
---|---
500 mg. tetracycline hydrochloride | 500
175 mg. nicotinamide | 175

The tetracycline and nicotinamide are dissolved in 4000 cc. water for injection. The solution is sterilized by passage through a sterile bacterial filter. 4.0 cc. is filled into each vial under aseptic conditions. The contents of each vial are frozen in the vial and dried in vacuo under aseptic conditions. When dry, each vial is closed with a sterile diaphragm and capped.

EXAMPLE 4.—INJECTABLE SOLUTION

Following the procedure of Example 1, 1000 milliliters of an injectable solution are prepared from the following types and amounts of ingredients.

Each milliliter: | | Total
---|---|---
55 mg. tetracycline hydrochloride | grams | 55
50 mg. magnesium chloride hexahydrate | do | 50
20 mg. procaine hydrochloride | do | 20
150 mg. ascorbic acid | do | 150
10 percent v./v. N,N-dimethylacetamide | milliliters | 100

Q.s. water for injection ad 1000 milliliters.

To determine the effect of the N,N-dimethylacetamide (DMA) on blood levels, the above formulation was checked in dogs with and without DMA and/or benzyl alcohol. The results are shown in Tables I and II.

*Table I*

TETRACYCLINE ACTIVITY IN SERUM AFTER I.M. ADMINISTRATION TO DOGS

[γ/ml. serum]

| Time, Hours | Water Alone | | | | 10% DMA | | | | 10% DMA+0.9% Benzyl Alcohol | | | |
|---|---|---|---|---|---|---|---|---|---|---|---|---|
| | 234 | 235 | 245 | Avg. | 246 | 249 | 250 | Avg. | 246 | 248 | 250 | Avg. |
| 0 | 0 | 0 | 0 | 0 | 0 | 0 | 0 | 0 | 0 | 0 | 0 | 0 |
| 1 | 1.6 | 1.6 | 1.6 | 1.6 | 3.2 | 3.2 | 3.2 | 3.2 | 3.2 | 3.2 | 3.2 | 3.2 |
| 2 | 1.6 | 1.6 | 1.6 | 1.6 | 3.2 | 3.2 | 1.6 | 2.7 | 3.2 | 3.2 | 3.2 | 3.2 |
| 3 | 1.6 | 1.6 | 1.6 | 1.6 | 1.6 | 1.6 | 1.6 | 1.6 | 3.2 | 3.2 | 3.2 | 3.2 |
| 4 | 0.8 | 1.6 | 1.6 | 1.3 | 1.6 | 1.6 | 1.6 | 1.6 | 3.2 | 3.2 | 3.2 | 3.2 |
| 5 | 0.8 | 1.6 | 1.6 | 1.3 | 1.6 | 1.6 | 1.6 | 1.6 | 3.2 | 3.2 | 3.2 | 3.2 |
| 6 | 0.8 | 1.6 | 1.6 | 1.3 | 1.6 | 1.6 | 1.6 | 1.6 | 3.2 | 3.2 | 3.2 | 3.2 |
| 7 | 0.8 | 1.6 | 1.6 | 1.3 | 1.6 | 1.6 | 1.6 | 1.6 | 1.6 | 1.6 | 3.2 | 2.4 |
| 8 | 0.8 | 1.6 | 1.6 | 1.3 | 1.6 | 1.6 | 1.6 | 1.6 | 1.6 | 1.6 | 3.2 | 2.4 |
| 12 | 0.8 | 0.8 | 0.8 | 0.8 | 1.6 | 0.8 | 1.6 | 1.3 | 1.6 | 1.6 | 1.6 | 1.6 |
| 24 | <0.2 | <0.2 | <0.2 | <0.2 | <0.2 | <0.2 | <0.2 | <0.2 | <0.2 | <0.2 | <0.2 | <0.2 |

*Table II*

TETRACYCLINE ACTIVITY IN SERUM AFTER I.M. ADMINISTRATION TO DOGS

[γ/ml. serum]

| Time, Hours | Water Alone | | | | 0.9% Benzyl Alcohol | | | | 10% DMA | | | | 10% DMA+0.9% Benzyl Alcohol | | | |
|---|---|---|---|---|---|---|---|---|---|---|---|---|---|---|---|---|
| | 234 | 235 | 245 | Avg. | 246 | 248 | 250 | Avg. | 246 | 249 | 250 | Avg. | 246 | 248 | 250 | Avg. |
| 0 | 0 | 0 | 0 | 0 | 0 | 0 | 0 | 0 | 0 | 0 | 0 | 0 | 0 | 0 | 0 | 0 |
| 1 | 1.6 | 1.6 | 1.6 | 1.6 | 3.2 | 1.6 | 1.6 | 2.1 | 3.2 | 3.2 | 3.2 | 3.2 | 3.2 | 3.2 | 3.2 | 3.2 |
| 2 | 1.6 | 1.6 | 1.6 | 1.6 | 3.2 | 1.6 | 1.6 | 2.1 | 3.2 | 3.2 | 1.6 | 2.7 | 3.2 | 3.2 | 3.2 | 3.2 |
| 3 | 1.6 | 1.6 | 1.6 | 1.6 | 1.6 | 1.6 | 1.6 | 1.6 | 1.6 | 1.6 | 1.6 | 1.6 | 3.2 | 3.2 | 3.2 | 3.2 |
| 4 | 0.8 | 1.6 | 1.6 | 1.3 | 1.6 | 1.6 | 1.6 | 1.6 | 1.6 | 1.6 | 1.6 | 1.6 | 3.2 | 3.2 | 3.2 | 3.2 |
| 5 | 0.8 | 1.6 | 1.6 | 1.3 | 1.6 | 1.6 | 1.6 | 1.6 | 1.6 | 1.6 | 1.6 | 1.6 | 3.2 | 3.2 | 3.2 | 3.2 |
| 6 | 0.8 | 1.6 | 1.6 | 1.3 | 1.6 | 1.6 | 1.6 | 1.6 | 1.6 | 1.6 | 1.6 | 1.6 | 3.2 | 3.2 | 3.2 | 3.2 |
| 7 | 0.8 | 1.6 | 1.6 | 1.3 | 1.6 | 1.6 | 1.6 | 1.6 | 1.6 | 1.6 | 1.6 | 1.6 | 1.6 | 1.6 | 3.2 | 2.4 |
| 8 | 0.8 | 1.6 | 1.6 | 1.3 | 1.6 | 1.6 | 0.8 | 1.3 | 1.6 | 1.6 | 1.6 | 1.6 | 1.6 | 1.6 | 3.2 | 2.4 |
| 12 | 0.8 | 0.8 | 0.8 | 0.8 | 0.8 | 0.8 | 0.8 | 0.8 | 1.6 | 0.8 | 1.6 | 1.3 | 1.6 | 1.6 | 1.6 | 1.6 |
| 24 | <0.2 | <0.2 | <0.2 | <0.2 | <0.2 | <0.2 | <0.2 | <0.2 | <0.2 | <0.2 | <0.2 | <0.2 | <0.2 | <0.2 | <0.2 | <0.2 |

B. Diluent: One thousand ampoules of diluent are prepared from the following types and amounts of materials:

10 percent v./v. N,N-dimethylacetamide ____ milliliters__ 470
9 mg. benzyl alcohol _____ grams__ 42.3
Q.s water for injection ad 4700 milliliters.

The benzyl alcohol is dissolved in the N,N-dimethylacetamide. This solution is then made up to volume with water for injection. The whole is then sterilized by passage through a bacterial filter, and 4.7 cc. of sterile solution is filled into each ampoule under aseptic conditions. The ampoules are heat sealed. The diluent is added, under aseptic conditions, at the same when it is desired to prepare the injectable composition. A unit package, wherein the dry active ingredient is placed in the lower compartment of a vial and the sterile diluent in the upper compartment can be used advantageously.

These data clearly show that higher blood levels are obtained by the use of the DMA containing vehicles than those without DMA. Moreover, the blood levels obtained by the use of the combination of DMA with benzyl alcohol are unexpectedly higher than those obtained by either DMA or benzyl alcohol without the other.

It is to be understood that the invention is not to be limited to the exact details of operation or exact compositions shown and described herein, as obvious modifications and equivalents will be apparent to one skilled in the art, and the invention is therefore to be limited only by the scope of the appended claims.

What is claimed is:

1. An injectable therapeutic composition comprising from about 0.5 percent to about fifty percent weight/volume of tetracycline as the essential active ingredient in an aqueous solvent vehicle comprising from about five percent to about ninety percent volume/volume of N,N-dimethylacetamide.

2. The composition of claim 1 wherein a minor proportion of benzyl alcohol is included as a part of the solvent vehicle.

References Cited in the file of this patent
UNITED STATES PATENTS

| | | |
|---|---|---|
| 2,671,748 | Crooks | Mar. 9, 1954 |
| 2,980,584 | Hammer | Apr. 18, 1961 |
| 2,990,331 | Neumann et al. | June 27, 1961 |

FOREIGN PATENTS

| | | |
|---|---|---|
| 91,111 | Norway | Jan. 4, 1958 |

OTHER REFERENCES

Vandernbelt et al.: Science, vol. 121, April 29, 1955, pages 646–647.

Squibb Abstract Bulletin, vol. 24, No. 31, August 1, 1951, p. 1183.

Ashton: Chemistry and Industry, September 17, 1955, page 1183.

Gans: J.A.P.A., Sci. Ed., vol. 46, No. 10, October 1957, pp. 587–591 (esp. pp. 589–590).

Kostenbauder: J.A.P.A., Sci. Ed., vol. 45 (1956), pp. 518 et seq.

Dispensatory of the U.S.A., 25th Ed., 1955, J.B. Lippincott, page 159.